US007969966B2

(12) United States Patent
Bohra et al.

(10) Patent No.: US 7,969,966 B2
(45) Date of Patent: Jun. 28, 2011

(54) SYSTEM AND METHOD FOR PORT MAPPING IN A COMMUNICATIONS NETWORK SWITCH

(75) Inventors: Subash Bohra, Oak Park, CA (US); Vincent Magret, Oak Park, CA (US); Steve Valentine, Camarillo, CA (US)

(73) Assignee: Alcatel Lucent, Paris (FR)

( * ) Notice: Subject to any disclaimer, the term of this patent is extended or adjusted under 35 U.S.C. 154(b) by 1503 days.

(21) Appl. No.: 11/311,716

(22) Filed: Dec. 19, 2005

(65) Prior Publication Data
US 2009/0180471 A1 Jul. 16, 2009

Related U.S. Application Data

(60) Provisional application No. 60/721,670, filed on Sep. 29, 2005.

(51) Int. Cl.
*H04L 12/66* (2006.01)
*G06F 15/16* (2006.01)
(52) U.S. Cl. ........ 370/352; 370/229; 370/254; 370/389; 370/465; 370/469; 709/223; 709/225; 709/229; 709/231; 709/236
(58) Field of Classification Search .......... 370/242–503; 709/213–234
See application file for complete search history.

(56) References Cited

U.S. PATENT DOCUMENTS

| 4,387,458 | A | * | 6/1983 | Carbrey | 370/431 |
|---|---|---|---|---|---|
| 5,305,311 | A | * | 4/1994 | Lyles | 370/390 |
| 5,319,644 | A | | 6/1994 | Liang | |
| 5,489,896 | A | * | 2/1996 | Sofer et al. | 370/445 |
| 5,541,928 | A | | 7/1996 | Kobayashi et al. | |
| 5,627,824 | A | * | 5/1997 | Arnold | 370/396 |
| 5,633,869 | A | * | 5/1997 | Burnett et al. | 370/396 |
| 5,781,549 | A | * | 7/1998 | Dai | 370/398 |
| 5,805,801 | A | * | 9/1998 | Holloway et al. | 726/22 |
| 5,822,309 | A | * | 10/1998 | Ayanoglu et al. | 370/315 |
| 5,825,772 | A | * | 10/1998 | Dobbins et al. | 370/396 |
| 5,941,979 | A | | 8/1999 | Lentz et al. | |
| 6,009,092 | A | * | 12/1999 | Basilico | 370/352 |

(Continued)

FOREIGN PATENT DOCUMENTS

EP 1770913 A1 * 4/2007

(Continued)

OTHER PUBLICATIONS

Xlyan Corporation: "Omniswitch 3.2 Complete Switching Systems for the Next Generation of Computing" User Manual, [Online] May 15, 1998, pp. 1-71, XP002418026 Retrieved from teh Internet: URL:http://www.humboldt.edu/~it1/equipint/xylang/docs/Xylan-omniswitch-manual/xylan/CH32.pdf.

(Continued)

*Primary Examiner* — Salman Ahmed
*Assistant Examiner* — Venkatesh Haliyur
(74) *Attorney, Agent, or Firm* — Wall & Tong, LLP (57) ABSTRACT

System and method for implementing a port mapping technique in a switch of a communications network, wherein the switch includes a plurality of ports including user ports and network ports, are described. In one embodiment, the method comprises identifying a first portion of the ports as user ports; identifying a second portion of the ports as network ports; assigning a plurality of the user ports to a first session; and preventing user ports assigned to the first session from interacting with one another.

22 Claims, 5 Drawing Sheets

U.S. PATENT DOCUMENTS

| | | | |
|---|---|---|---|
| 6,021,495 A * | 2/2000 | Jain et al. ............... | 726/16 |
| 6,026,078 A | 2/2000 | Smith | |
| 6,084,856 A * | 7/2000 | Simmons et al. .......... | 370/235 |
| 6,229,538 B1 | 5/2001 | McIntyre et al. | |
| 6,304,973 B1 * | 10/2001 | Williams ............... | 726/3 |
| 6,331,983 B1 * | 12/2001 | Haggerty et al. ......... | 370/400 |
| 6,363,081 B1 | 3/2002 | Gase | |
| 6,381,218 B1 * | 4/2002 | McIntyre et al. .......... | 370/245 |
| 6,421,342 B1 * | 7/2002 | Schwartz et al. .......... | 370/392 |
| 6,421,735 B1 | 7/2002 | Jung et al. | |
| 6,430,626 B1 | 8/2002 | Witkowski et al. | |
| 6,438,132 B1 * | 8/2002 | Vincent et al. .......... | 370/395.42 |
| 6,453,371 B1 | 9/2002 | Hampson et al. | |
| 6,466,583 B1 * | 10/2002 | Laraqui ............... | 370/465 |
| 6,519,051 B1 * | 2/2003 | Wu et al. ............... | 358/1.15 |
| 6,564,261 B1 | 5/2003 | Gudjonsson et al. | |
| 6,647,018 B1 | 11/2003 | Juntunen et al. | |
| 6,741,592 B1 | 5/2004 | Edsall et al. | |
| 6,766,373 B1 | 7/2004 | Beadle et al. | |
| 6,810,041 B2 | 10/2004 | Walker, III et al. | |
| 6,839,747 B1 * | 1/2005 | Blumenau et al. .......... | 709/223 |
| 6,850,542 B2 * | 2/2005 | Tzeng ............... | 370/475 |
| 6,892,309 B2 | 5/2005 | Richmond et al. | |
| 6,907,036 B1 * | 6/2005 | Malalur ............... | 370/382 |
| 6,952,401 B1 * | 10/2005 | Kadambi et al. .......... | 370/232 |
| 6,956,824 B2 * | 10/2005 | Mark et al. ............... | 370/242 |
| 6,967,949 B2 * | 11/2005 | Davis et al. ............... | 370/390 |
| 6,993,027 B1 * | 1/2006 | Kadambi et al. .......... | 370/394 |
| 7,031,297 B1 * | 4/2006 | Shabtay et al. .......... | 370/352 |
| 7,031,302 B1 * | 4/2006 | Malalur ............... | 370/357 |
| 7,031,327 B2 * | 4/2006 | Lu ............... | 370/401 |
| 7,035,255 B2 * | 4/2006 | Tzeng ............... | 370/389 |
| 7,035,286 B2 * | 4/2006 | Tzeng ............... | 370/475 |
| 7,050,431 B2 * | 5/2006 | Tzeng ............... | 370/389 |
| 7,082,133 B1 * | 7/2006 | Lor et al. ............... | 370/392 |
| 7,145,869 B1 * | 12/2006 | Kadambi et al. .......... | 370/229 |
| 7,171,504 B2 * | 1/2007 | Ishii ............... | 710/305 |
| 7,174,390 B2 * | 2/2007 | Schulter et al. .......... | 709/245 |
| 7,197,044 B1 * | 3/2007 | Kadambi et al. .......... | 370/418 |
| 7,216,161 B1 * | 5/2007 | Peckham et al. .......... | 709/224 |
| 7,231,430 B2 * | 6/2007 | Brownell et al. .......... | 709/218 |
| 7,290,283 B2 * | 10/2007 | Copeland, III ............ | 726/25 |
| 7,310,664 B1 * | 12/2007 | Merchant et al. .......... | 709/220 |
| 7,339,938 B2 * | 3/2008 | Tzeng ............... | 370/396 |
| 7,380,025 B1 * | 5/2008 | Riggins et al. .......... | 710/8 |
| 7,394,756 B1 * | 7/2008 | Cook ............... | 370/216 |
| 7,424,012 B2 * | 9/2008 | Tzeng ............... | 370/389 |
| 7,447,197 B2 * | 11/2008 | Terrell et al. .......... | 370/360 |
| 7,460,488 B2 * | 12/2008 | Mayernick ............... | 370/254 |
| 7,469,298 B2 * | 12/2008 | Kitada et al. .......... | 709/236 |
| 7,516,487 B1 * | 4/2009 | Szeto et al. ............... | 726/22 |
| 7,633,948 B2 * | 12/2009 | Yokomitsu et al. ...... | 370/395.54 |
| 7,747,836 B2 * | 6/2010 | Rajan et al. ............... | 711/203 |
| 7,783,735 B1 * | 8/2010 | Sebes et al. ............... | 709/223 |
| 2002/0191589 A1 * | 12/2002 | Vassiliou ............... | 370/352 |
| 2003/0142674 A1 * | 7/2003 | Casey ............... | 370/393 |
| 2003/0206523 A1 * | 11/2003 | Lu ............... | 370/231 |
| 2003/0227904 A1 * | 12/2003 | Rabinovich et al. ......... | 370/352 |
| 2004/0062257 A1 * | 4/2004 | Nguyen ............... | 370/403 |
| 2004/0210663 A1 * | 10/2004 | Phillips et al. ............... | 709/230 |
| 2004/0218539 A1 * | 11/2004 | Anqud et al. ............... | 370/241 |
| 2004/0243710 A1 * | 12/2004 | Mao ............... | 709/227 |
| 2004/0268140 A1 | 12/2004 | Zimmer et al. | |
| 2005/0010811 A1 | 1/2005 | Zimmer et al. | |
| 2005/0041596 A1 | 2/2005 | Yokomitsu et al. | |
| 2005/0058118 A1 | 3/2005 | Davis et al. | |
| 2005/0060414 A1 * | 3/2005 | Phillips et al. ............... | 709/227 |
| 2005/0078171 A1 * | 4/2005 | Firestone et al. ......... | 348/14.08 |
| 2005/0083949 A1 * | 4/2005 | Dobbins et al. ......... | 370/395.53 |
| 2005/0091387 A1 * | 4/2005 | Abe ............... | 709/228 |
| 2005/0169315 A1 * | 8/2005 | Jiang et al. ............... | 370/493 |
| 2005/0190788 A1 * | 9/2005 | Wong et al. ............... | 370/466 |
| 2005/0232254 A1 * | 10/2005 | Korner ............... | 370/360 |
| 2005/0232285 A1 * | 10/2005 | Terrell et al. ............... | 370/401 |
| 2006/0107108 A1 * | 5/2006 | Geng et al. ............... | 714/11 |
| 2006/0182118 A1 * | 8/2006 | Lam et al. ............... | 370/395.42 |
| 2006/0209807 A1 * | 9/2006 | Lor et al. ............... | 370/352 |
| 2006/0272014 A1 * | 11/2006 | McRae et al. ............... | 726/12 |
| 2007/0002899 A1 * | 1/2007 | Raman et al. ............... | 370/469 |
| 2007/0014290 A1 * | 1/2007 | Dec et al. ............... | 370/390 |

FOREIGN PATENT DOCUMENTS

WO      WO 9736407 A1 *   10/1997

OTHER PUBLICATIONS

Alcatel: "Omniswitch 6800/6850/9000 release 6.1.3.R01" Release Notes, [Online] 2006, pp. 1-82, XP002418027 Retrieved from the Internet: URL:http://www.commswitch.be/files/613R01_revA.pdf.

* cited by examiner

|    | A | B | M1 | M2 | M3 | N1 | N2 | N3 |
|----|---|---|----|----|----|----|----|----|
| A  | ✕ | 0 | 0  | 0  | 0  | 1  | 1  | 0  |
| B  | 0 | ✕ | 0  | 0  | 0  | 1  | 1  | 0  |
| M1 | 0 | 0 | ✕  | 0  | 0  | 0  | 0  | 1  |
| M2 | 0 | 0 | 0  | ✕  | 0  | 0  | 0  | 1  |
| M3 | 0 | 0 | 0  | 0  | ✕  | 0  | 0  | 1  |
| N1 | 1 | 1 | 0  | 0  | 0  | ✕  | 0  | 1  |
| N2 | 1 | 1 | 0  | 0  | 0  | 0  | ✕  | 1  |
| N3 | 0 | 0 | 1  | 1  | 1  | 1  | 1  | ✕  |

Switch S1

FIG. 8A

|    | G | H | Z | N7 |
|----|---|---|---|----|
| G  | ✕ | 0 | 0 | 1  |
| H  | 0 | ✕ | 0 | 1  |
| Z  | 0 | 0 | ✕ | 1  |
| N7 | 1 | 1 | 1 | ✕  |

Switch S4

FIG. 8B

SYSTEM AND METHOD FOR PORT MAPPING IN A COMMUNICATIONS NETWORK SWITCH

PRIORITY UNDER 35 U.S.C. §119(e) & 37 C.F.R. §1.78

This nonprovisional application claims priority based upon the following prior United States provisional patent application entitled: "PORT MAPPING WITH USER/NETWORK PORTS," Application No. 60/721,670, filed on Sep. 29, 2005, in the names of: Subash Bohra, Vincent Magret, and Steve Valentine which is hereby incorporated by reference.

BACKGROUND OF THE INVENTION

1. Technical Field of the Invention

The present invention generally relates to communications networks. More particularly, and not by way of any limitation, the present invention is directed to system and method for port mapping in switches of such networks.

2. Description of Related Art

In the past, it has been common communications network engineering practice to separate traffic belonging to different users using a router, which is a Layer 3 ("L3") device by assigning each user to a different subnet identified by a unique L3 address. The router would then transmit each user's packets out through a port assigned to the user's subnet. In view of the fact that only a limited number of bits in the L3 address are used for the subnet mask, the number of subnets that may be addressed by a single router is limited.

It will be recognized that in a communications network, there are many users of the network who require that their traffic be kept absolutely separate from the traffic of other users. For example, an Internet service provider ("ISP") will typically have many customers who want to connect to a server farm. Access to the ISP is through a router connected to a common external computer network, such as the Internet. This router must route each customer's traffic to that customer's local area network ("LAN") in such a manner as to maintain security and privacy between the data of different customers. It is imperative that the ISP prevent traffic originating from one customer's server from being received by another customer's server. As previously indicated, a limitation in the use of subnets in this scenario is that there is only a limited number of subnets which can be defined from standard Layer 3 addresses. In modern computer network systems, this numerical limitation severely restricts the number of individual users that can be serviced and also have their data traffic maintained separately. Further, the management of a large number of subnets by a network manager quickly becomes burdensome, especially in the event that the network has thousands of customers whose packet traffic must be kept separate.

Another means by which users traffic may be kept separate is through use private Virtual Local Area Networks (VLANs) defined within a network switch, or bridge, which is a Layer 2 ("L2") device. A private VLAN is a VLAN feature in which access ports of a switch are allowed to communicate only with certain designated router ports. The security implementation with a Private VLAN is conducted at the hardware layer and does not allow for any frame of any sort to pass between adjacent access ports within a Private VLAN. Private VLANs provide port-based security and isolation between ports within the assigned VLAN. Data traffic on downlink ports can only be forwarded to, and from, uplink ports. A deficiency of private VLANs is that they can be difficult to configure and may not provide a complete solution in some cases.

SUMMARY OF THE INVENTION

One embodiment is a method of implementing a port mapping technique in a switch of a communications network, wherein the switch includes a plurality of ports including user ports and network ports. The method comprises identifying a first portion of the ports as user ports; identifying a second portion of the ports as network ports; assigning a plurality of the user ports to a first session; and preventing user ports assigned to the first session from interacting with one another.

Another embodiment is a method of implementing a port mapping technique in a switch of a communications network, wherein the switch includes a plurality of ports. The method comprises identifying a first portion of the ports as user ports; identifying a second portion of the ports as network ports; assigning a plurality of the user ports to a first session; preventing user ports assigned to the first session from interacting with one another; and permitting the user ports assigned to the first session to interact with ports not assigned to the first session as long as none of the network ports is assigned to the first session.

Another embodiment is a system for implementing a port mapping technique in a switch of a communications network, wherein the switch includes user ports for connecting to user devices and network ports for connecting to network devices. The system comprises means for assigning a plurality of the user ports to a first session; and means for preventing user ports assigned to the first session from interacting with one another.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Embodiments of the invention will now be described with reference to various examples of how the invention can best be made and used. Like reference numerals are used throughout the description and several views of the drawings to indicate like or corresponding parts, wherein the various elements are not necessarily drawn to scale.

Figure 1:
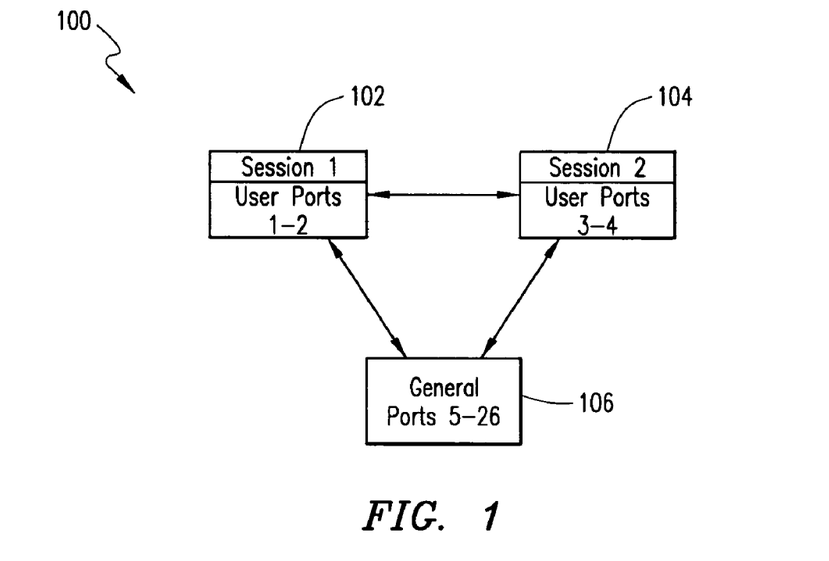
FIG. 1 is a block diagram of a switch in which a port mapping technique in accordance with one embodiment is implemented.

As will be described in detail hereinbelow, one embodiment is a system and method for port mapping in a communications network switch. In particular, the embodiments described herein distinguish between network ports (i.e., ports that connect a switch to other switches in a network) and user ports (i.e., ports to which user devices are connected to the switch) in connection with a port mapping session, identified by a session ID assigned to the port. In general, when only one side (i.e., user ports) of a session is created on a switch, the user ports of that session can communicate with any other ports on the switch, but not with each other. This situation is illustrated in FIG. 1. In particular, as shown in FIG. 1, two sessions (Session 1 and Session 2) are created on a switch 100. Session 1 user ports 102 are ports 1-2. Session 2 user ports 104 are ports 3-4. The remaining ports 5-26 are general ports 106. Because no network ports have been created for either Session 1 or Session 2, the Session 1 user ports 102 can communicate with the Session 2 user ports 104 and the general ports 106 on the switch 100. Similarly, the Session 2 user ports 104 can communicate with the Session 1 user ports 102 and the general port 106 on the switch 100. However, the Session 1 user ports 102 (ports 1 and 2) cannot communicate with one another; similarly, the Session 2 user ports 104 (ports 3 and 4) cannot communicate with one another. The general ports 106 (ports 5-26), on the other hand, are not similarly restricted and can communicate with one another.

When two sides (i.e., user ports and network ports) of a session are created on a single switch, the user ports in the session can communicate only with the network ports in the same session and with no other ports on the switch. The session thus forms a closed entity on the switch with respect to the user ports. This situation is illustrated in FIG. 2.

Figure 2:
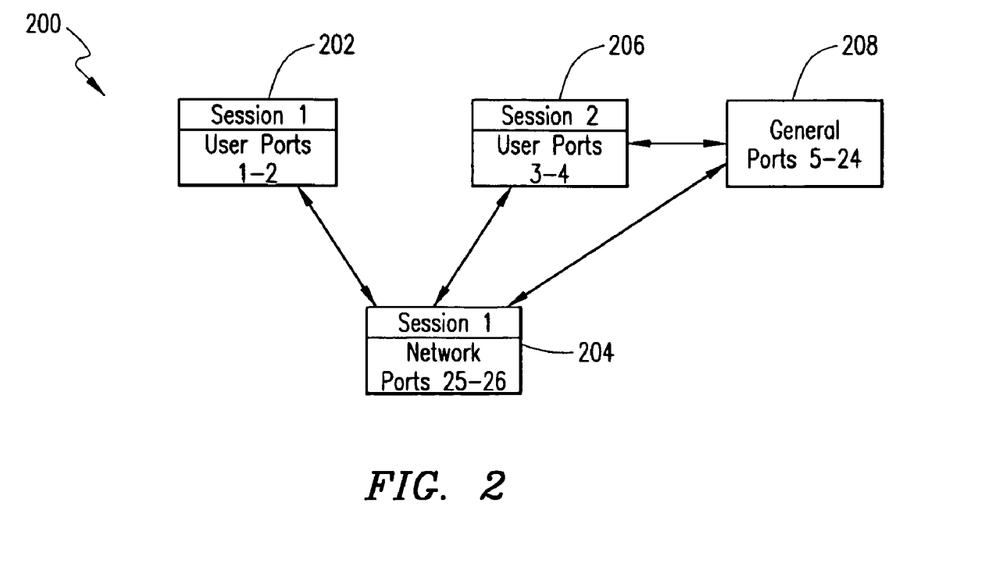
FIG. 2 is a block diagram of a switch in which a port mapping technique in accordance with one embodiment is implemented.

In particular, as shown in FIG. 2, two sessions (Session 1 and Session 2) are created on a switch 200. Session 1 user ports 202 are ports 1-2. Session 1 network ports 204 are ports 25-26. Session 2 user ports 206 are ports 3-4. The remaining ports 5-24 are general ports 208. Because network ports 204 have been created for Session 1, the Session 1 user ports 202 can communicate only with the Session 1 network ports 204. In contrast, the Session 2 user ports 206 can communicate with the Session 1 network ports 204 and with the general ports 208 on the switch 200. Once again, however, the Session 1 user ports 202 (ports 1 and 2) cannot communicate with one another; similarly, the Session 2 user ports 206 (ports 3 and 4) cannot communicate with one another. The network ports 204 and the general ports 208 (ports 5-26), on the other hand, are not similarly restricted and can communicate with one another.

In general, for user and network ports, the following rules are applied by the embodiments described herein for implementing port mapping using network and user ports.
1. A port mapping session comprises a session ID, a set of user ports, and/or a set of network ports.
2. A port mapping session can be configured with or without user ports and network ports.
3. User ports with a common session ID cannot communicate with each other.
4. A user port can be part of only one port mapping session at any time.
5. A user port cannot be a network port and vice versa.
6. If a set of network ports of a given session is non-empty, then any user ports of the same session can only communicate with members of that set of network ports.
7. If a session is configured as "bidirectional", the network ports of that session cannot communicate with other network ports of the same session.

The "closure" referred to above is primarily provided by rule 6, which prevents user ports from communicating with other ports in the system.

Figure 3:
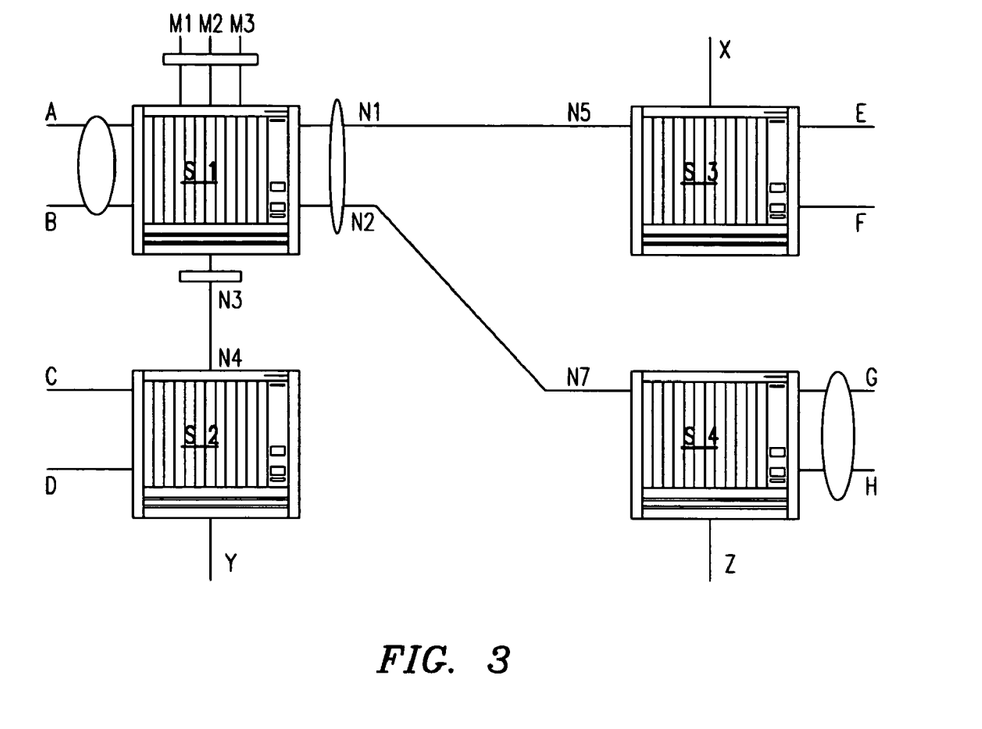
FIG. 3 is a block diagram of a communications network in which a port mapping technique in accordance with one embodiment is implemented.

Application of the above-listed rules will now be illustrated in greater detail with reference to FIGS. 3-4. In particular, FIG. 3 illustrates a port mapping among four switches S1-S4 in a network 100 in accordance with one embodiment. The switch S1 has a plurality of user ports A, B, and M1-M3, as well as a plurality of network ports N1-N3. Similarly, the switch S2 has user ports C, D, and Y, and a network port N4. The switch S3 has user ports E, F, and X and a network port N5, and the switch S4 has user ports G, H, and Z, and a network port N7. It will be assumed for the sake of example, that the following port mapping sessions have been configured on the network 100 as illustrated in FIG. 3.

On Switch S1:
  Port Mapping Session 1 (Session ID=1): ports A and B are user ports; ports N1 and N2 are network ports configured in bidirectional mode
  Port Mapping Session 2 (Session ID=2): ports M1, M2, and M3 are user ports, port N3 is a network port On Switch S2:
  Port Mapping Session 1 (Session ID=1): ports G and H are user ports, port N7 is a network port Based on the configuration shown in FIG. 3 and described above, the following is attained:
1. User ports A and B cannot interact with one another (because they have the same session ID);
2. User ports A and B cannot interact with ports on the switch S2 (because they can only communicate with network ports N1 (to switch S3) and N2 (to switch S4);
3. User ports C, D, and Y can interact with all user ports on the network except user ports A and B on the switch S1 (for the same reasons as set forth above);
4. User ports G and H cannot interact with each other (because they have the same session ID);
5. User ports G and H can interact with all the user ports on the switch S1 except user ports M1, M2, and M3, but cannot interact with any port on the switch S3 (network port N7 (switch S4) is connected to network port N2 (switch S1), which is session ID 1 and therefore communicates with user ports A and B, but not M1, M2, and M3; network ports N1 and N2 cannot communicate with one another due to bidirectional session); and
6. User ports E, F, and X can interact with all of the user ports on the switch S1 except the user ports M1, M2, and M3, but cannot interact with any port on the switch S4 (same reason as above).

Figure 4:
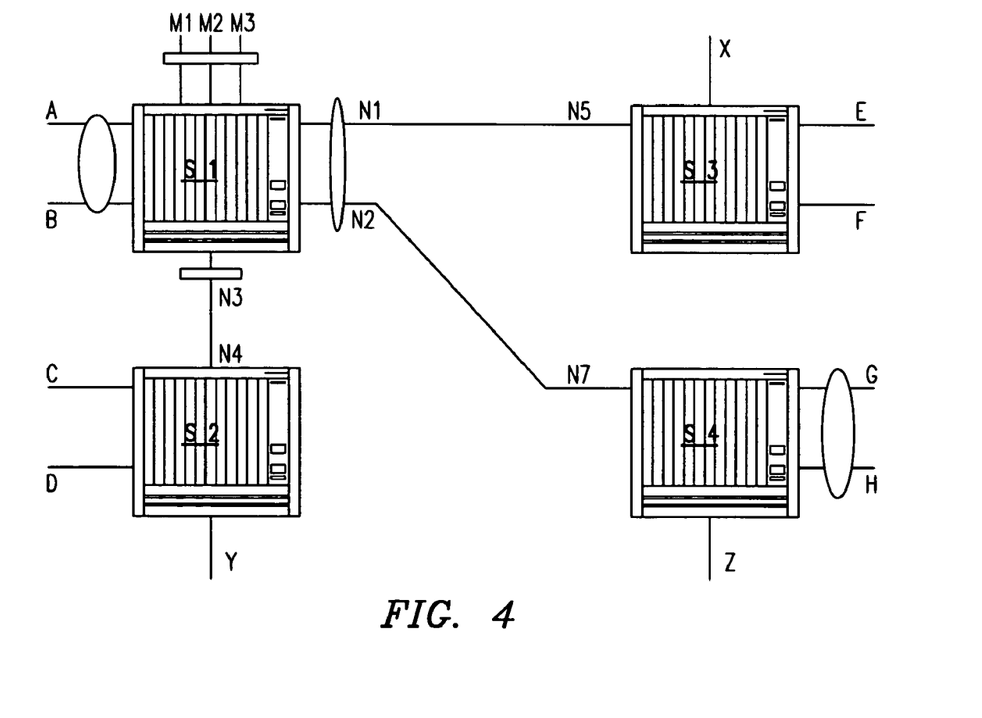
FIG. 4 is a block diagram of a communications network in which a port mapping technique in accordance with one embodiment is implemented.

Referring now to FIG. 4, it will be assumed for the sake of example, that the following port mapping sessions have been configured on the network 100 as illustrated in FIG. 4.

On Switch S1
  Port Mapping Session 1 (Session ID=1): ports A and B are user ports; ports N1 and N2 are network ports configured in unidirectional mode.
  Port Mapping Session 2 (Session ID=2): ports M1, M2, and M3 are user ports; port N3 is a network port.

On Switch S4
  Port Mapping Session 1 (Session ID=1): ports G and H are user ports, port N7 is a network port.

Based on the foregoing configuration illustrated in FIG. 4 and described above, the following is attained:
1. User ports A and B cannot interact with one another (because they have the same session ID);
2. User ports A and B cannot interact with ports on the switch S2 (because they can only communicate with network ports N1 (to switch S3) and N2 (to switch S4);
3. User ports C, D, and Y can interact with all user ports on the network except user ports A and B on the switch S1 (for the same reasons as set forth above);
4. User ports G and H cannot interact with each other (because they have the same session ID);
5. User ports G and H can interact with all the user ports on the switch S1 except user ports M1, M2, and M3 (network port N7 (switch S4) is connected to network port N2 (switch S1), which is session ID 1 and therefore communicates with user ports A and B, but not M1, M2, and M3) and can interact with any port on switch S2 or switch S3 (network ports N1 and N2 can communicate with each other due to unidirectional session); and
6. User ports E, F, and X can interact with all of the user ports on the switch S1 except the user ports M1, M2, and M3 and can interact with any port on the switch S2 or the switch S3 (same reason as above).

It will be recognized that if network ports N1, N2, and N3 are made part of both of the sessions on the switch S1 (i.e., sessions 1 and 2), which is configurable, then the ports N1, N2, and N3 will be able to interact with each other and the user ports C, D and Y on the switch S2 will be able to interact with all of the user ports on the switches S1, S3, and S4.

Figure 5:
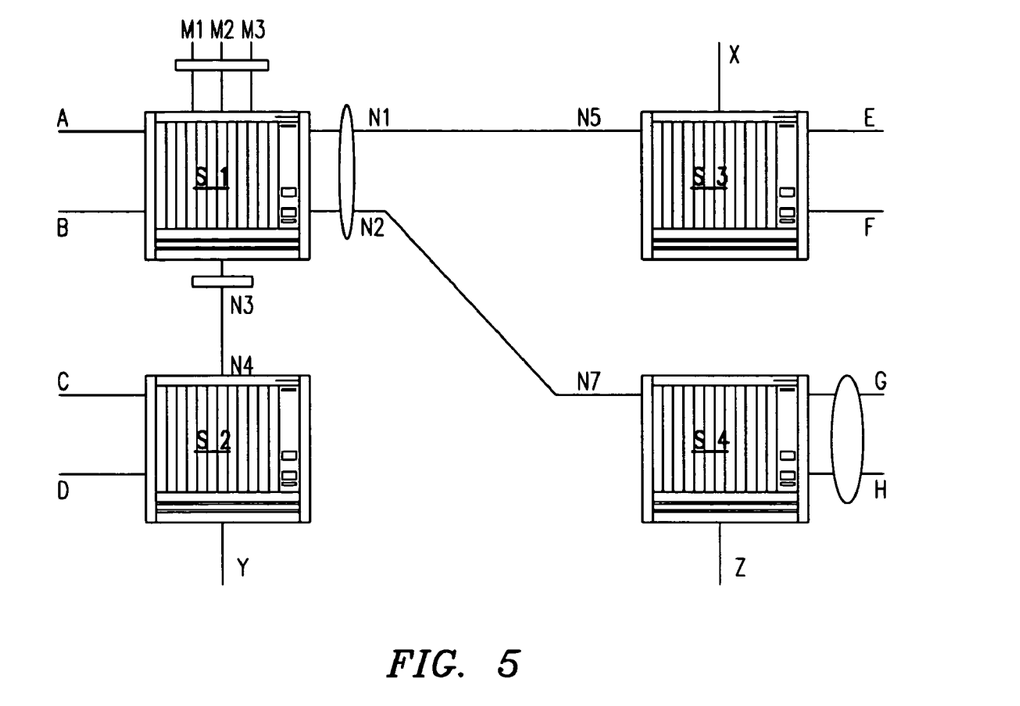
FIG. 5 is a block diagram of a communications network in which a port mapping technique in accordance with one embodiment is implemented.

Referring now to FIG. 5, it will be assumed for the sake of example, that the following port mapping sessions have been configured on the network 100 as illustrated in FIG. 5.
On Switch 1:
  Port Mapping Session 1 (Session ID=1): ports N1 and N2 are network ports configured in bidirectional mode.
  Port Mapping Session 2 (Session ID=2): port N3 is a network port.
On Switch 4:
  Port Mapping Session 1 (Session ID=1): ports G and H are user ports.
Based on the foregoing, the following situation is attained:
1. User ports A, B, M1, M2, and M3 can interact with one another (all are general ports with no session ID);
2. The only restriction on the switch S1 is that network ports N1 and N2 cannot interact with one another (bidirectional session), thus restricting switches S3 and S4 from communicating with one another;
3. User ports G and H on switch S4 cannot interact with one another (ports G and H have the same session ID) and cannot interact with ports on the switch S3 (due to inability of network ports N1 and N2 to interact with one another).

Figure 6:
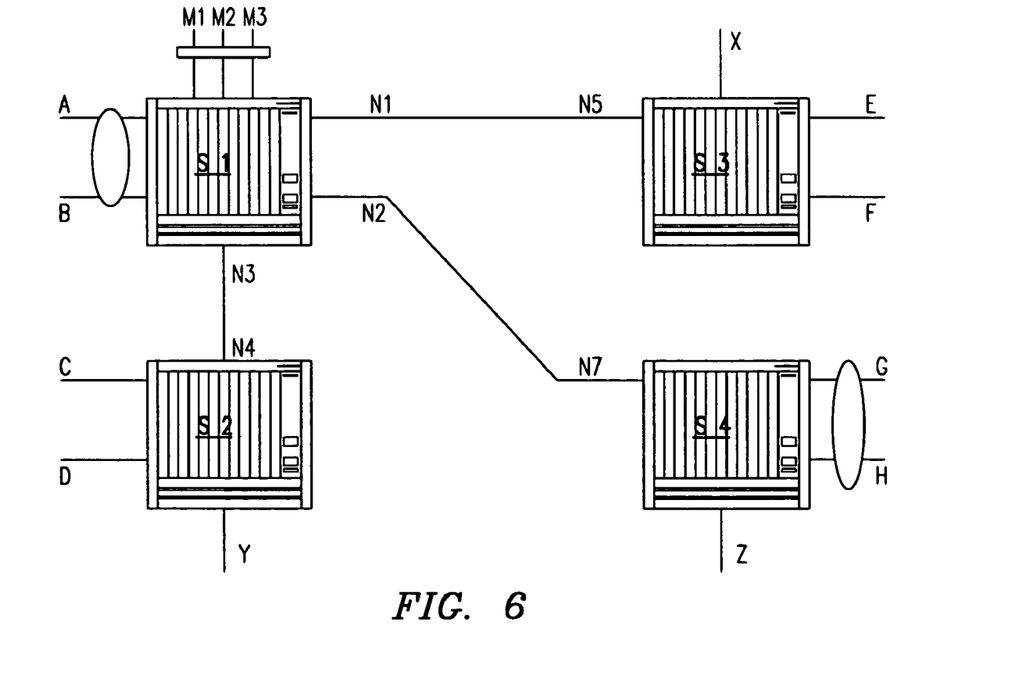
FIG. 6 is a block diagram of a communications network in which a port mapping technique in accordance with one embodiment is implemented.

Referring now to FIG. 6, it will be assumed for the sake of example, that the following port mapping sessions have been configured on the network 100 as illustrated in FIG. 6.
On Switch S1:
  Port Mapping Session 1 (Session ID=1): ports A and B are user ports.
  Port Mapping Session 2 (Session ID=2): ports M1, M2, and M3 are user ports.
On Switch S4:
  Port Mapping Session 1 (Session ID=1): ports G and H are user ports.
Based on the forgoing, the following situation is attained:
1. User ports A and B cannot interact with one another (same session ID).
2. User ports M1, M2, and M3 cannot interact with one another (same session ID).
3. User port A can interact with user ports M1, M2, and M3, and vice versa (different session IDs and no network port assigned to session).
4. User port B can interact with user ports M1, M2, and M3, and vice versa (same as above).
5. User ports G and H cannot interact with one another (same session ID).

Figure 7:
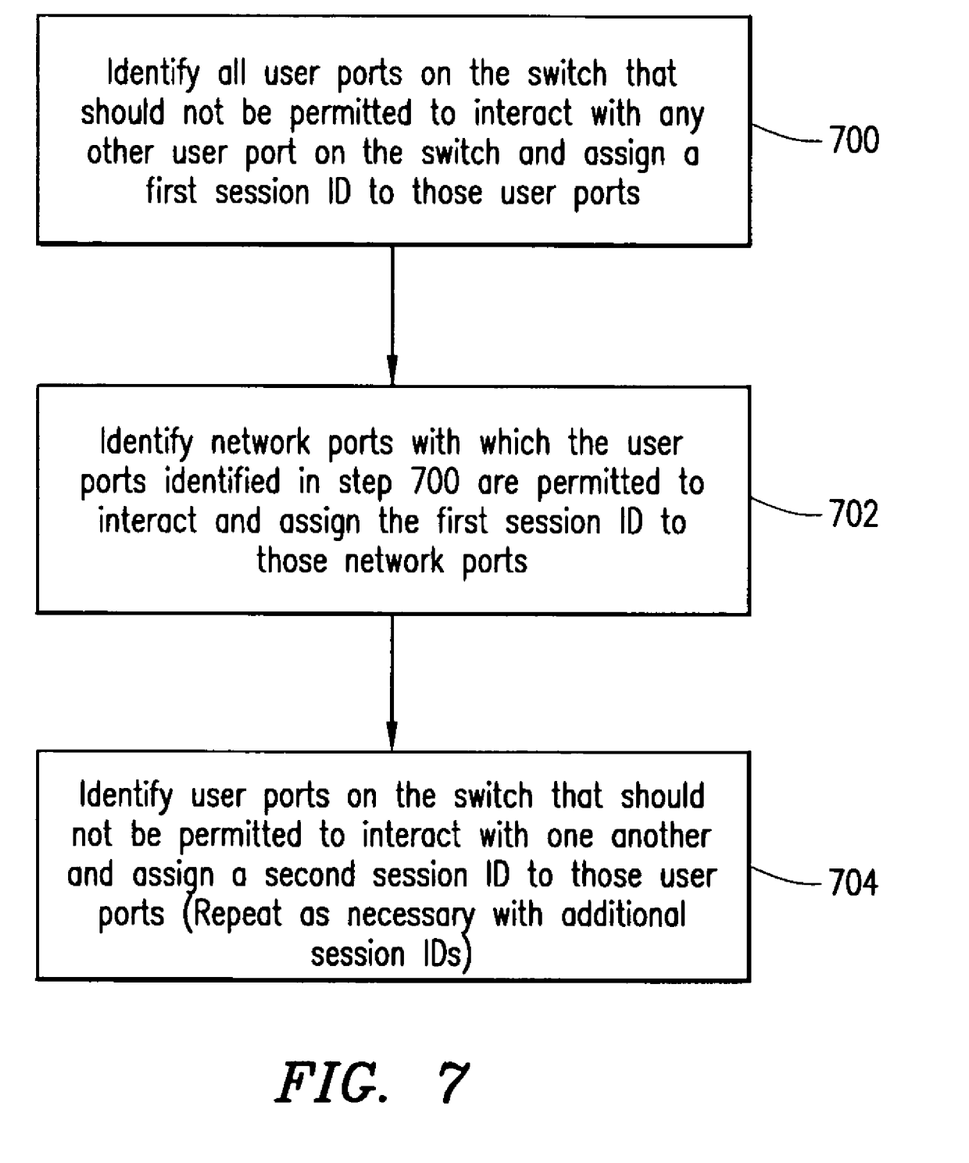
FIG. 7 is a flowchart of the operation of a port mapping technique in accordance with one embodiment for configuring a switch.

FIG. 7 is a flowchart of the operation of the embodiments described herein for configuring a switch for implementation of port mapping using network and user ports. In step 700, a network administrator identifies all user ports on the switch that should not be permitted to interact with any other user port on the switch and assigns a first session ID to those user ports. In step 702, the network administrator identifies network ports with which the user ports identified in step 700 are permitted to interact and assigns the first session ID to those network ports. As a result, the only ports on the switch with which the user ports identified in step 700 are able to interact are the network ports identified in step 702.

In step 704, the network administrator identifies user ports on the switch that should not be permitted to interact with one another and assigns a second session ID to those user ports. Step 704 may be repeated for any number of groups of user ports that are not to be permitted to interact with one another, but are permitted to interact with user ports of other sessions, general ports, and network ports.

In one embodiment, the rules are implemented by establishing the allowed ports by bitmap tables within generally available application specific integrated circuits ("ASICs") in the switches. The configuration is managed so that the desired behavior is attained. For example, on one ASIC, when a packet is received at a port, the switch decides to which port to transmit the packet. In one embodiment, the corresponding entry in the port bitmap table that allows for transmit is set to zero for restricted ports and to one for allowed ports.

Figure 8A:
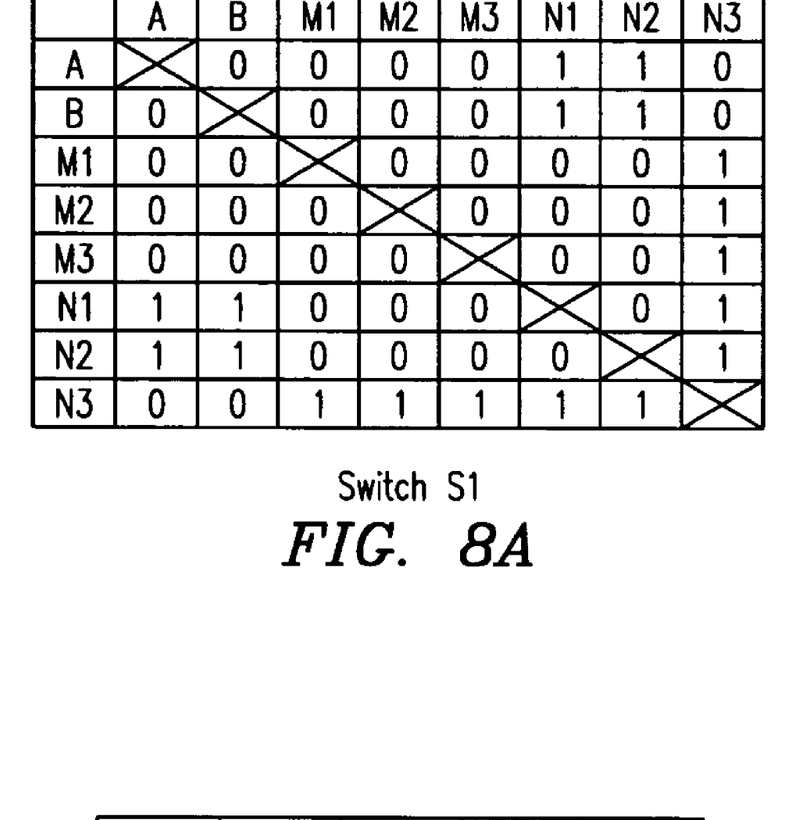
FIGS. 8A and 8B illustrate port bitmap tables for respective switches of a network in which a port mapping technique in accordance with one embodiment is implemented.
Figure 8B:
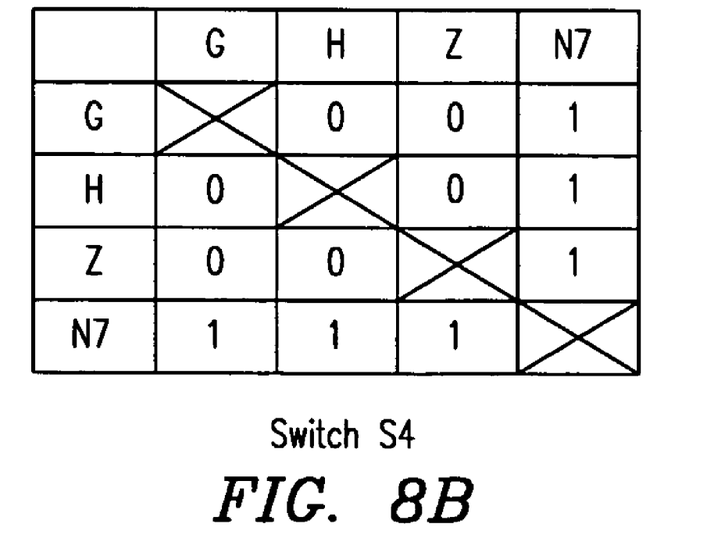

FIGS. 8A and 8B illustrate exemplary bitmap tables for the ports of the switches S1 and S4, respectively, of FIG. 3 when those switches are configured as illustrated in that figure. A one in an entry indicates that interaction is allowed between the corresponding ports; a zero indicates that interaction is not allowed. For example, as illustrated in FIG. 8A, interaction is not allowed between user ports A and B, as indicated by a zero in the corresponding entries for those ports, while interaction is allowed between user port A and network port N1, as indicated by a one in the corresponding entries for those ports.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method of implementing a port mapping technique in a switch of a communications network, the switch comprising a plurality of ports including user ports and network ports, the user ports for connecting to user devices and the network ports for connecting to network devices, the method comprising:
  identifying a first portion of the ports as user ports;
  identifying a second portion of the ports as network ports;
  assigning a plurality of the user ports to a first session and a second session;

assigning a plurality of the network ports to the first session, the second session;

preventing user ports assigned to the first session from interacting with one another and network ports other than the network port assigned to the first session;

preventing the network ports assigned to the second session from interacting with one another; and permitting the user ports assigned to the first session to interact with ports not assigned to the first session.

2. The method of claim 1 further comprising assigning none of the network ports to the first session.

3. The method of claim 1 further comprising:
assigning one of the network ports to the first session.

4. The method of claim 1 further comprising:
permitting the user ports assigned to the first session to interact with ports not assigned to the first session as long as none of the network ports is assigned to the first session.

5. The method of claim 1 wherein the first session is a unidirectional session, the method further comprising permitting the network ports assigned to the first session to interact with one another.

6. The method of claim 1 wherein the first session is a bidirectional session, the method further comprising preventing the network ports assigned to the first session from interacting with one another.

7. The method of claim 1 wherein the preventing user ports assigned to the same session from interacting with one another comprises preventing a packet received by the switch at a first one of the user ports assigned to a session from being transmitted from the switch via a second one of the user ports assigned to the same session.

8. The method of claim 1 wherein the user ports are connectable to user devices.

9. The method of claim 1 wherein the network ports are connectable to other switches in the communications network.

10. A method of implementing a port mapping technique in a switch of a communications network, the switch comprising a plurality of user ports for connecting to user devices and network ports for connecting to network devices, the method comprising:
identifying a first portion of the ports as user ports;
identifying a second portion of the ports as network ports;
assigning a plurality of the user ports, a plurality of the network ports to a first session;
preventing user ports assigned to the first session from interacting with one another and network ports other than the network port assigned to the first session;
permitting the user ports assigned to the first session to interact with ports not assigned to the first session as long as none of the network ports is assigned to the first session; and
permitting the network ports assigned to the first session to interact with one another.

11. The method of claim 10 further comprising:
assigning one of the network ports to the first session.

12. The method of claim 10 wherein the first session is a unidirectional session.

13. The method of claim 10 wherein the first session is a bidirectional session, the method further comprising preventing the network ports assigned to the first session from interacting with one another.

14. A system for implementing a port mapping technique in a switch of a communications network, the switch comprising user ports for connecting to user devices and network ports for connecting to network devices, the system comprising:
means for assigning a plurality of the user ports, a plurality of the network ports to a first session;
means for preventing user ports assigned to the first session from interacting with one another;
means for permitting the user ports assigned to the first session to interact with user ports and network ports that are not assigned to the first session as long as none of the network ports is assigned to the first session; and
means for permitting the network ports assigned to the first session to interact with one another.

15. The system of claim 14 further comprising means for assigning none of the network oils to the first session.

16. The system of claim 14 wherein the means for preventing and means for permitting comprise entries in a bitmap table for the switch.

17. The system of claim 14 further comprising:
means for assigning one of the network ports to the first session; and
means for preventing the user ports assigned to the first session from interacting with network ports other than the network port assigned to the first session.

18. The system of claim 14 further comprising:
means for assigning a plurality of the user ports to a second session; and
means for preventing the user ports assigned to the second session from communicating with one another.

19. The system of claim 14 wherein the first session is a unidirectional session.

20. The system of claim 14 wherein the first session is a bidirectional session, the system further comprising means for preventing the network ports assigned to the first session from interacting with one another.

21. The system of claim 14 wherein the means for preventing user ports assigned to the same session from interacting with one another comprises means for preventing a packet received by the switch at a first one of the user ports assigned to a session from being transmitted from the switch via a second one of the user ports assigned to the same session.

22. The system of claim 14 wherein the means for preventing comprises an entry in a bitmap table for the switch.

\* \* \* \* \*